Aug. 16, 1966  R. H. NEALY  3,266,824
COUPLING

Filed Feb. 4, 1965  2 Sheets-Sheet 1

INVENTOR.
ROBERT H. NEALY
BY
John J. Byrne
ATTORNEY

Aug. 16, 1966 R. H. NEALY 3,266,824
COUPLING
Filed Feb. 4, 1965 2 Sheets-Sheet 2

United States Patent Office 3,266,824
Patented August 16, 1966

3,266,824
COUPLING
Robert H. Nealy, 3 Clovis Road, East Brunswick, N.J.
Filed Feb. 4, 1965, Ser. No. 433,533
5 Claims. (Cl. 285—212)

This is a continuation-in-part of application Serial No. 217,848, filed August 20, 1962, now abandoned.

This invention relates to a coupling unit and more specifically relates to a means for securing one end of a conduit to a fitting or the like in high pressure environments.

A principal objective of this invention is to provide a chamber for an annular sealing ring which is so constructed that the sealing ring will not extrude from the chamber. The chamber is formed by an annular tapered seat receiving a wedge ring whereby the ring is received in the seat at that position causing a positive seal.

Another important objective of this invention is to provide a wedge ring for such an assembly which is conveniently mounted and secured to the conduit prior to assembly of the conduit to the fitting. The wedge ring is so secured to provide a positive end-load support for the conduit.

A further objective of this invention is to provide a wedge ring for such an assembly which is easily secured to a conduit and removed therefrom such that it may be conveniently replaced or re-used.

A still further objective of the invention is to provide a coupling unit in which there are means to account for variations in manufacturing tolerances from nominal external conduit dimensions, without seriously affecting the sealing characteristics of the coupling unit.

Still another objective of the invention is to provide a pair of novel guard rings for use with a split wedge ring such that a resilient sealing means will be prevented from extruding therethrough.

A still further objective is to provide structure for positioning an O-ring where the essential initial squeeze is accomplished even though significant dimensional variations in the assembly are present.

These and other objectives of the invention will become more apparent upon a reading of the following description, taken in view of the drawings, in which.

Figure 1:
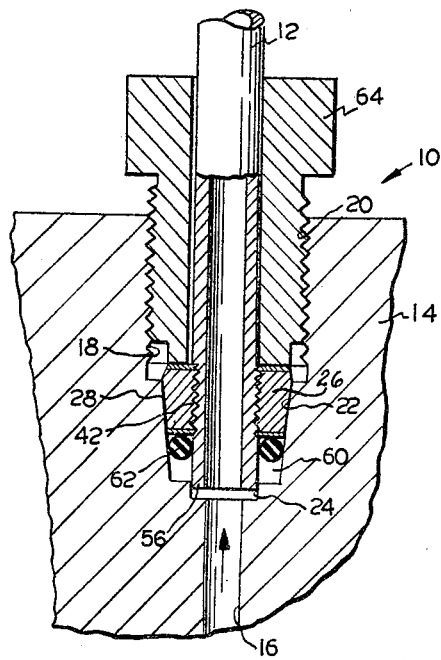
FIGURE 1 is a cross-sectional view of the assembly showing the elements under a positive conduit pressure.

Referring now more specifically to the drawings wherein like elements are indicated by like numerals, the numeral 10 indicates the coupling assembly of this invention. In the embodiment shown, a conduit 12 is secured to a connection or a fitting having a receptacle 14. The connection is of a type having at least one passageway 16 extending therethrough and said passageway is equipped with a conduit receptable 18 at one end thereof. The receptable is divided generally into three parts, a threaded portion 20, a tapered surface 22, and a counter-bore 24. The counter-bore 24 is directly adjacent the passageway 16.

Secured to one end of the conduit 12 is a split wedge ring 26. The outer surface of the wedge ring has a first tapered surface 28 having a degree of slope substantially the same as that of the tapered surface 22. The purpose of taper 28 is to prevent scoring of surface 22 when the wedge is received in the taper 28. At its upper end the wedge ring is formed with a reverse taper 30. The wedge ring is split along its circumference at 32 and its upper and lower surfaces 34 and 36 are respectively notched at 38 and 40. About its interior the wedge ring is equipped with a series of parallel ridges 42 for purposes hereinafter described.

Figure 3:
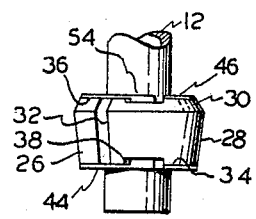
FIGURE 3 is a side elevation view of the wedge ring of this invention secured to a conduit.
Figure 5:
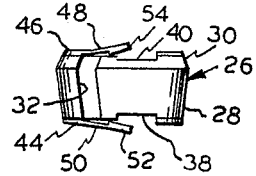
FIGURE 5 is an elevation view of the wedge ring prior to attachment to a conduit.

A pair of resilient split guard rings 44 and 46 are secured to surfaces 34 and 36 by a weld or the like about portions of their length and have free ends 48 and 50 equipped with lugs 52 and 54 respectively which are adapted for reception in recesses 38 and 40 formed in the bottom and top of the wedge ring. As can best be seen in FIGS. 3 and 5 when the split ring is in its opened or expanded position, the lugs are disengaged from their recesses and when the ring is contracted the lugs mate with their respective recesses. The recesses are of sufficient dimensions to permit movement of the lugs circumferentially within the recess during the various stages of contraction. The spring-like nature of the wedge permits its removal from the tube when desired without difficulty. The fact that the wedge is split permits one to cut corresponding ridges on the tube prior to inserting the wedge thereover.

Referring back to FIGURES 1 and 2, it can be seen that the wedge ring is secured to the conduit at a distance from the conduit end so that surfaces 22 and 28 are in engagement when the end 56 of the conduit is received in counter-bore 24. A shoulder 58 is formed between the counter-bore and the tapered surface which forms, with the ring 26, a chamber 60. Housed within the chamber is an annular sealing member which in the embodiment described is shown as an O-ring such that under all conditions of operation it will be slightly compressed when residing within the chamber 60. It should be noted here that slight manufacturing variations in the external conduit dimensions will be automatically compensated for with the maintenance of adequate initial compression of the O-ring by the longitudinal reorientation of the wedge ring and the O-ring which occurs as a result of these variations. The shoulder, together with the conduit prevents the O-ring from being sucked from the chamber in the event of negative pressure in the passageway.

The wedge ring 26 is secured to the conduit prior to its assembly within the receptacle or fitting. As previously mentioned, the inner surface of the wedge ring is equipped with a series of parallel ridges 42. The purpose of the ridges is to affix the wedge ring to the conduit on which complementary ridges have been previously machined in a manner to provide end-load support to the conduit when it is subjected to pressure.

When the wedge ring is so secured, no longitudinal relative movement is permitted between the wedge ring and the conduit, and the engagement of lugs 52 and 54 with their respective recesses maintains the wedge ring in a partially contracted condition. When partially or fully contracted, the wedge ring will be unable to move longitudinally of the conduit and its relationship with the outer end of the conduit will be positively maintained. After the wedge ring is secured, the O-ring 62 is inserted over the conduit and the assembly is inserted into receptacle 18 until surface 22 engages surface 28. As the ring and conduit are inserted, the O-ring is pushed to a position within the chamber 60 such that a satisfactory initial squeeze is applied. In the event the tube deviates from its nominal dimensions, the wedge ring 26 and the O-ring 62 will advance more or less along the longitudinal length of receptacle 18 and the extent of this movement will be directly related to the variation from nominal conduit dimensions thereby maintaining the requisite initial squeeze on the O-ring regardless of conduit variation. The reverse taper 30 permits a full longitudinal movement of the wedge ring along the chamfered surface.

Figure 2:
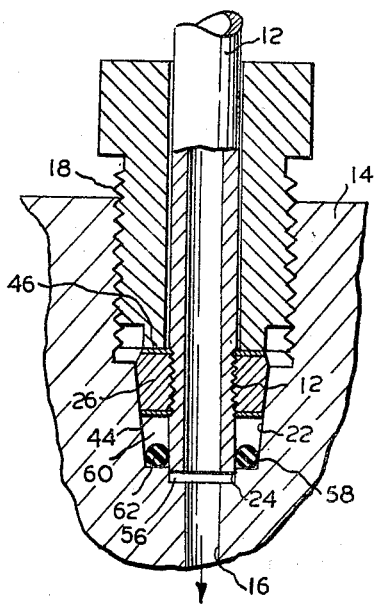
FIGURE 2 is a view similar to FIGURE 1 showing the elements under a negative conduit pressure.
Figure 4:
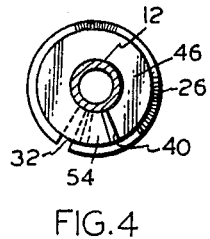
FIGURE 4 is a plan view of FIGURE 3.

As seen best in FIG. 1, in the event of high pressures within the passageway 16, the O-ring is forced into a sealing engagement with the wedge ring, the conduit, and the chamfered surface. Since the lower guard ring 44 spans the slot 32, any extrusion of the O-ring is prevented. In the event of a negative pressure in conduit 16, the O-ring is forced into sealing engagement with the chamfered surface, the shoulder 58, and the conduit. The threaded positioning gland nut 64 provides a support for the wedge ring 26 as it transmits end-loads.

The importance of the arrangement described in overcoming manufacturing differences can be well understood by referring to FIGURES 6a–6f. It will be noted that the receptacle taper 22 cooperating with the bottom edge of the wedge provides the structure to prevent O-ring extrusion. The wedge taper 28 is to prevent scoring of the taper 22.

Figure 6A:
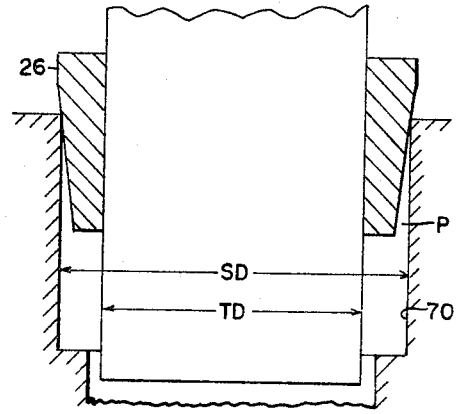
FIGURES 6a-6f are diagrammatic views showing how the tapered seat and wedge ring account for variations in manufacturing dimensions.
Figure 6B:
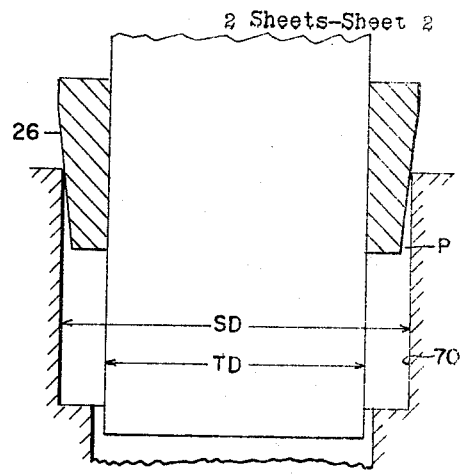
Figure 6C:
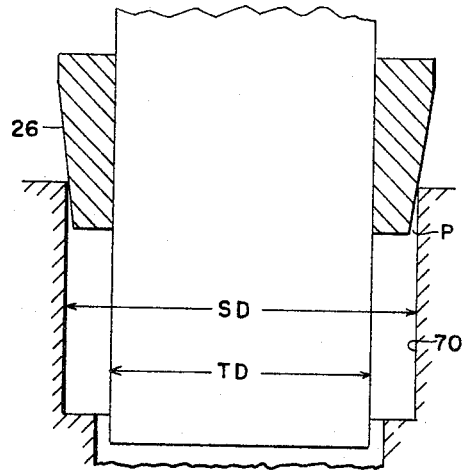

FIGURE 6a shows a tapered wedge 26 received against a cylindrical seat 70 wherein the seat diameter SD is at the maximum manufacturing tolerance and the tube diameter TD approaches the minimum tolerance. An extrusion path P is formed. FIGURE 6b shows intermediate diameters and still a wedge shape path P is formed although smaller than in FIG. 6a. FIG. 6c discloses a condition wherein SD approaches the minimum tolerance and TD approaches maximum tolerance. It can be seen that an extrusion path P in communication with the O-ring chamber is formed in each instance. An O-ring in the annular space SD-TD will be forced into P if the pressure rises high enough and will stretch at its I.D. thus opening the leakage between the conduit and the wedge ring.

Figure 6D:
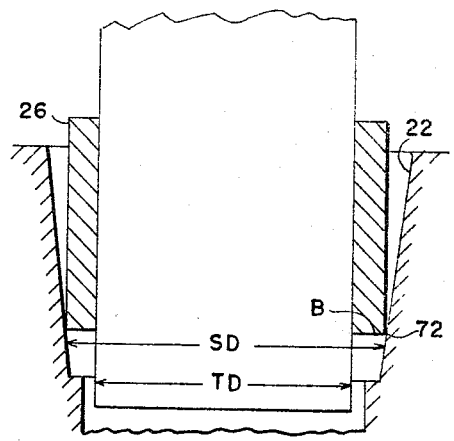
Figure 6E:
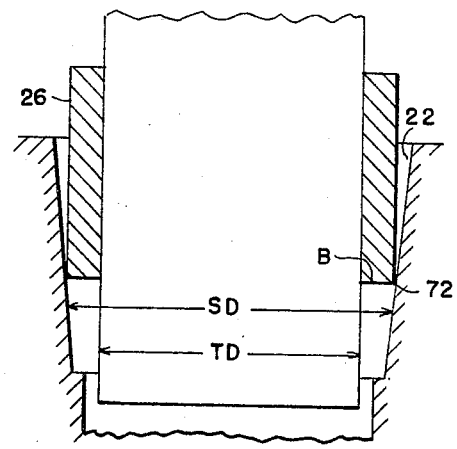
Figure 6F:
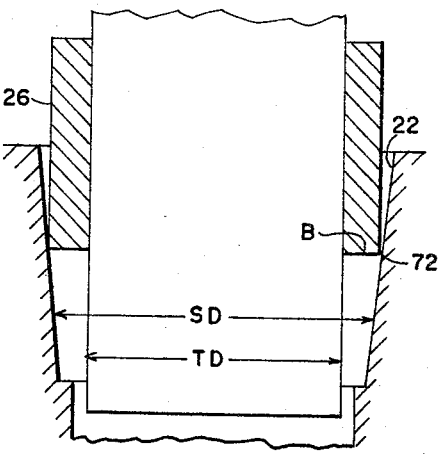

FIGURES 6d, 6e, and 6f, respectively, disclose the dimensions of 6a, 6b, and 6c, but with the seat tapered rather than the wedge. Note that the lower outer edge 72 of the wedge ring, in each instance of tolerance variation, positively engages the taper 22 to eliminate the extrusion paths of FIGURES 6a, 6b, and 6c. This is the case of the present invention. In other words, the dimensions of the O-ring chamber may vary but not the fact that lower edge 72 of the wedge engages the taper 22 of the seat.

Figure 7:
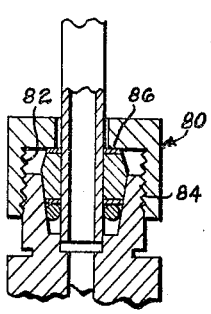
FIGURE 7 is an embodiment of the invention showing a different gland nut.

FIGURE 7 illustrates another embodiment of the invention. In this instance, a female gland nut 80 is used. The nut is interiorly threaded at 82 to mate with the exterior threads 84 about the fitting. The wedge ring 26 extends above its tapered seat so that the inwardly directed flanges 86 of nut 80 can engage the upper surface of the wedge and carry the wedge into contact with the seat surface.

It should be noted further that in FIGURES 6a, 6b, and 6c, the degree of initial squeeze on a particular O-ring will not be affected by the position of the wedge with respect to the seat. In FIGURES 6d, 6e, and 6f, however, the wedge is received by the seat an amount to insure that the O-ring will have an initial squeeze primarily as a result of the relatively stable dimensional quality of lower surface B.

In a general manner, while there has been disclosed in the above description what is demed to be the most practical and efficient embodiment of the invention, it should be well understood that the invention is not limited to such an embodiment as there might be changes made in the arrangement, disposition, and form of the parts without departing from the principle of the present invention as comprehended within the scope of the accompanying claims.

I claim:
1. A coupling unit comprising a connection member having a truncated conical opening with downwardly and inwardly tapering walls therein;
   a conduit concentricaly disposed within said opening to define an annulus in combination with the walls of said opening;
   an annular sealing means disposed in said annulus and sealingly engaging the outer wall of said conduit, the major diameter of said sealing means when relaxed being greater than the minor diameter of said opening;
   a split wedge ring disposed around said conduit in said annulus, means to cover the split in said wedge ring at least on the lower transverse surface thereof, the taper on the outer periphery of said wedge ring being no greater than the taper of the walls of the opening, the transverse thickness of said wedge ring at the lower end thereof being greater than the thickness of said annulus at the lower end thereof and at most equal to the relaxed annular thickness of said sealing means, and means to drive and retain said wedge ring in said annulus in gripping engagement with said conduit.

2. A coupling unit in accordance with claim 1 wherein the lower end of said truncated conical opening terminates in a transverse inwardly extending shoulder defining a bore of a diameter suitable to closely receive said conduit therein, and wherein said conduit extends at least to the entrance to the bore defined by said shoulder.

3. A coupling unit in accordance with claim 1 wherein said wedge ring is formed with a plurality of circumferential parallel ridges circumscribed about its inner surface and is secured against longitudinal displacement relative to said conduit by engagement with complementary parallel ridges machined about the exterior surface of said conduit prior to assembly.

4. A coupling unit in accordance with claim 1 wherein said annular sealing means comprises an O-ring.

5. A coupling unit in accordance with claim 1 wherein said means to cover the split in said ring comprises a spanning member attached to said ring and formed with a single radial slit disposed such that coincidence of said split and said slit is avoided to prevent extrusion of said sealing means under pressure through the split in said wedge ring.

References Cited by the Examiner

UNITED STATES PATENTS

| | | | |
|---|---|---|---|
| 1,823,061 | 9/1931 | Pearson | 277—111 |
| 2,190,419 | 2/1940 | Evarts | 285—356 X |
| 2,377,891 | 6/1945 | Laue | 285—356 X |
| 2,452,890 | 11/1948 | Wolfram | 285—349 X |
| 2,457,648 | 12/1948 | Donner | 285—323 |
| 2,477,969 | 8/1949 | Donner | 285—349 |
| 2,935,343 | 5/1960 | Ellis | 285—349 X |
| 3,092,404 | 6/1963 | MacWilliam | 285—356 X |

FOREIGN PATENTS

| | | |
|---|---|---|
| 712,991 | 8/1931 | France. |
| 1,110,963 | 7/1961 | Germany. |

CARL W. TOMLIN, *Primary Examiner.*

C. FAGAN, S. R. MILLER, R. GIANGIORGI,
*Assistant Examiners.*